US009971837B2

United States Patent
Zhu et al.

(10) Patent No.: US 9,971,837 B2
(45) Date of Patent: May 15, 2018

(54) CONTEXTUAL BASED SEARCH SUGGESTION

(71) Applicant: Yahoo! Inc., Sunnyvale, CA (US)

(72) Inventors: Shenhong Zhu, Santa Clara, CA (US); Anlei Dong, Fremont, CA (US); Kazuhiro Nakao, Sunnyvale, CA (US); Hongbo Deng, San Jose, CA (US); Hui Wu, Sunnyvale, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 544 days.

(21) Appl. No.: 14/106,989

(22) Filed: Dec. 16, 2013

(65) Prior Publication Data

US 2015/0169606 A1 Jun. 18, 2015

(51) Int. Cl.
*G06F 17/30* (2006.01)

(52) U.S. Cl.
CPC .. *G06F 17/30867* (2013.01); *G06F 17/30646* (2013.01)

(58) Field of Classification Search
CPC ........... G06F 17/30867; G06F 17/3064; G06F 17/30761; G06F 17/30654; G06F 17/30392; G06F 17/30646; G06F 17/3097
USPC ................ 707/706, 765–768, 759
See application file for complete search history.

(56) References Cited

U.S. PATENT DOCUMENTS

| 7,689,554 B2 * | 3/2010 | Jones ................. G06F 17/3066 707/999.004 |
| 8,838,527 B2 * | 9/2014 | Olston .............. G06F 17/30442 707/609 |
| 9,336,211 B1 * | 5/2016 | Bousquet .......... G06F 17/30038 |
| 2010/0131538 A1 * | 5/2010 | Jones ................ G06F 17/30864 707/759 |
| 2011/0078243 A1 * | 3/2011 | Carpenter ............ G06F 17/246 709/204 |
| 2012/0296927 A1 * | 11/2012 | Velipasaoglu .... G06F 17/30867 707/768 |
| 2013/0282682 A1 * | 10/2013 | Batraski ........... G06F 17/30864 707/706 |
| 2013/0282702 A1 * | 10/2013 | Zhu ..................... G06F 17/3064 707/723 |
| 2013/0282709 A1 * | 10/2013 | Zhu ..................... G06F 17/3064 707/728 |

OTHER PUBLICATIONS

Cao et al., "Context-Aware Query Suggestion by Mining Click-Through and Session Data", KDD '08 Aug. 24-27, 2008, Las Vegas, Mevada, 9 pages.*

* cited by examiner

*Primary Examiner* — Monica Pyo
(74) *Attorney, Agent, or Firm* — Pillsbury Winthrop Shaw Pittman LLP

(57) ABSTRACT

Methods, systems and programming for providing query suggestions based on user's previous search query. In one example, an input including a prefix of a first query is received from a user in a user session. At least a second query that was previously received from the user in the user session is then obtained. A third query is obtained based on the second query and the prefix of the first query. One or more query suggestions are provided to the user as a response to the input. The one or more query suggestions include the third query.

18 Claims, 11 Drawing Sheets

CONTEXTUAL BASED SEARCH SUGGESTION

BACKGROUND

1. Technical Field

The present teaching relates to methods, systems, and programming for Internet services. Particularly, the present teaching is directed to methods, systems, and programming for search suggestion.

2. Discussion of Technical Background

Online content search is a process of interactively searching for and retrieving requested information via a search application running on a local user device, such as a computer or a mobile device, from online databases. Online search is conducted through search engines, which are programs running at a remote server and searching documents for specified keywords and return a list of the documents where the keywords were found. Known major search engines have features called "search suggestion" designed to help users narrow in on what they are looking for. For example, as users type a search query, a list of query suggestions that have been used by many other users before are displayed to assist the users in selecting a desired search query.

However, existing search engines focus on how to discover relevant queries from query logs without considering users' current search behavior, which is very important in many scenarios. Traditional search suggestion systems have three common features: (1) suggestion database is generated by mining search logs and combining other knowledge databases; (2) personal suggestion database contains user's search history in the past; and (3) query suggestion is based on user's prefix input in the search box. As described by these features, query suggestions in the known solutions mainly come from general users' past search behavior, which ignores a specific user's immediate previous query in the same user session as context. On the other side, users' immediate previous query is very important, since users' intent or interests are explicitly expressed in previous search.

Therefore, there is a need to provide an improved solution for search suggestion to solve the above-mentioned problems.

SUMMARY

The present teaching relates to methods, systems, and programming for Internet services. Particularly, the present teaching is directed to methods, systems, and programming for search suggestion.

In one example, a method, implemented on at least one machine each having at least one processor, storage, and a communication platform connected to a network for providing query suggestions is presented. An input including a prefix of a first query is received from a user in a user session. At least a second query that was previously received from the user in the user session is then obtained. A third query is obtained based on the second query and the prefix of the first query. One or more query suggestions are provided to the user as a response to the input. The one or more query suggestions include the third query.

In a different example, a system having at least one processor, storage, and a communication platform for providing query suggestions is presented. The system includes a request processing unit, a first suggestion retrieving unit, and a query suggestions generation unit. The request processing unit is implemented on the at least one processor and configured to receive, in a user session, an input including a prefix of a first query from a user. The first suggestion retrieving unit is implemented on the at least one processor and configured to obtain at least a second query that was previously received from the user in the user session. The first suggestion retrieving unit is further configured to obtain a third query based on the second query and the prefix of the first query. The query suggestions generation unit is implemented on the at least one processor and configured to provide one or more query suggestions to the user as a response to the input. The one or more query suggestions include the third query.

Other concepts relate to software for providing query suggestions. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for providing query suggestions is presented. The recorded information, when read by the machine, causes the machine to perform a series of steps. An input including a prefix of a first query is received from a user in a user session. At least a second query that was previously received from the user in the user session is then obtained. A third query is obtained based on the second query and the prefix of the first query. One or more query suggestions are provided to the user as a response to the input. The one or more query suggestions include the third query.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and effective search suggestion. The method and system as disclosed herein aim at improving end-users' search experience by taking users' current search behavior, e.g., immediate previous query, into account, which makes search suggestion engines understand users' intent more precisely. Users' previous queries in the same user session, in particular the immediate previous query, are very important, since users' intent or interests are explicitly expressed in previous search. Because of this consideration, users will be recommended more relevant queries and select their queries more efficiently, which will improve search engine's user experience. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1:
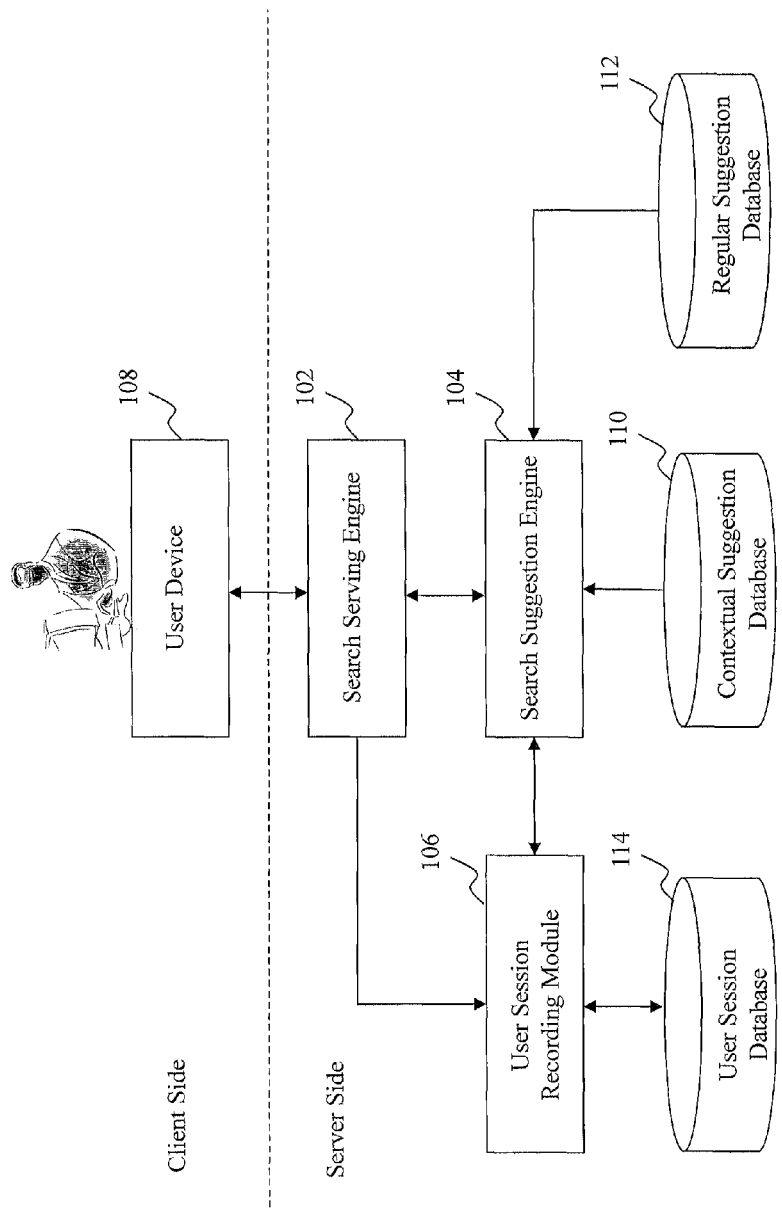
FIG. 1 is a high level exemplary system diagram of a system for contextual based search suggestion, according to an embodiment of the present teaching.

FIG. 1 is a high level exemplary system diagram of a system for contextual based search suggestion, according to an embodiment of the present teaching. In this embodiment, the system is deployed on one or more servers and includes a search serving engine 102, a search suggestion engine 104, and a user session recording module 106. A user in this embodiment performs an online search through a user device 108 and the backend search serving engine 102. The user instantly gets search suggestions provided by the backend search suggestion engine 104 based on at least the user's previous query in the same user session recorded by the user session recording module 106.

The user device 108 may be a laptop computer, desktop computer, netbook computer, media center, mobile device (e.g., a smart phone, tablet, music player, and global positioning system (GPS) receiver), gaming console, set-top box, printer, or any other suitable device. A search application, such as a web browser or a standalone search application, may be pre-installed on the user device 108 by the vendor of the user device 108 or installed by the user. The search application may serve as an interface between the user and the remote search serving engine 102. The search application may be stored in storage of the user device 108 and loaded into a memory once it is launched by the user. Once the search application is executed by one or more processors of the user device 108, the user device 108 sends a query or a prefix of a query (i.e., the first one or more characters of a query) entered by the user to the remote search serving engine 102. The user device 108 then receives search suggestions generated by the search suggestion engine 104. The user device 108 also receives query results, e.g., a list of hyperlinks, from the search serving engine 102 once the user selects one of the query suggestions.

The search serving engine 102 in this example may be any suitable search engine. The search serving engine 102 is responsible for analyzing the received query from the user device 108, fetching query results, and returning the query results to the user device 108. In this example, the search serving engine 102 also communicates with the user session recording module 106 by providing each search query entered by a user and its associated information, such as timestamps of each search query, to the user session recording module 106. Search queries, including the prefix of a search query, are continuously fed into the search suggestion engine 104 by the search serving engine 102 for generating and updating search query suggestions. The search serving engine 102 may maintain logs of user activities performed in connection with the search activities. For example, the search serving engine 102 may maintain records of each search query issued to the search serving engine 102, the time at which the search query is received (timestamps of each query), the user session during which the search query is issued, the browser cookie of the browser through which a network user accesses the search serving engine 102 and issues the search query, the network resources identified for the search query, the links clicked by the user after issuing the search query (e.g., the links that are contained in the web page used to present the search result for the search query), and so on. Any information in the logs of user activities may also be provided to the search suggestion engine 104 and/or the user session recording module 106 by the search serving engine 102 in this embodiment.

The user session recording module 106 in this embodiment is configured to record all the search queries received by the search serving engine 102 and organize them by user sessions. Each user session is associated with a particular user identified by, for example, a unique user ID. The user ID may be obtained from user login information or cookies by the search suggestion engine 104. A user session may be a period of time in which a user interfaces with a search application. The user session begins when the user accesses the search application and ends when the user quits the search application or when the user has not interacted with the search application for a predetermined period of time, i.e., the idle time is above a threshold value, e.g., 5 minutes. In addition, a user session may be defined by a predetermined time window, e.g., 10 minutes. That is, any user activities occur within the predetermined time window after the user accesses the search application is considered as in the same user session, and the user session ends when the predetermined time window ends. A user may interact with the search application by subsequently entering multiple search queries, which are received by the search serving engine 102 with corresponding timestamps and forwarded to the user session recording module 106. In this embodiment, based on the unique user ID and timestamps, search queries entered by a specific user are organized into user sessions and stored in a remote user session database 114 on a server.

Figure 2:
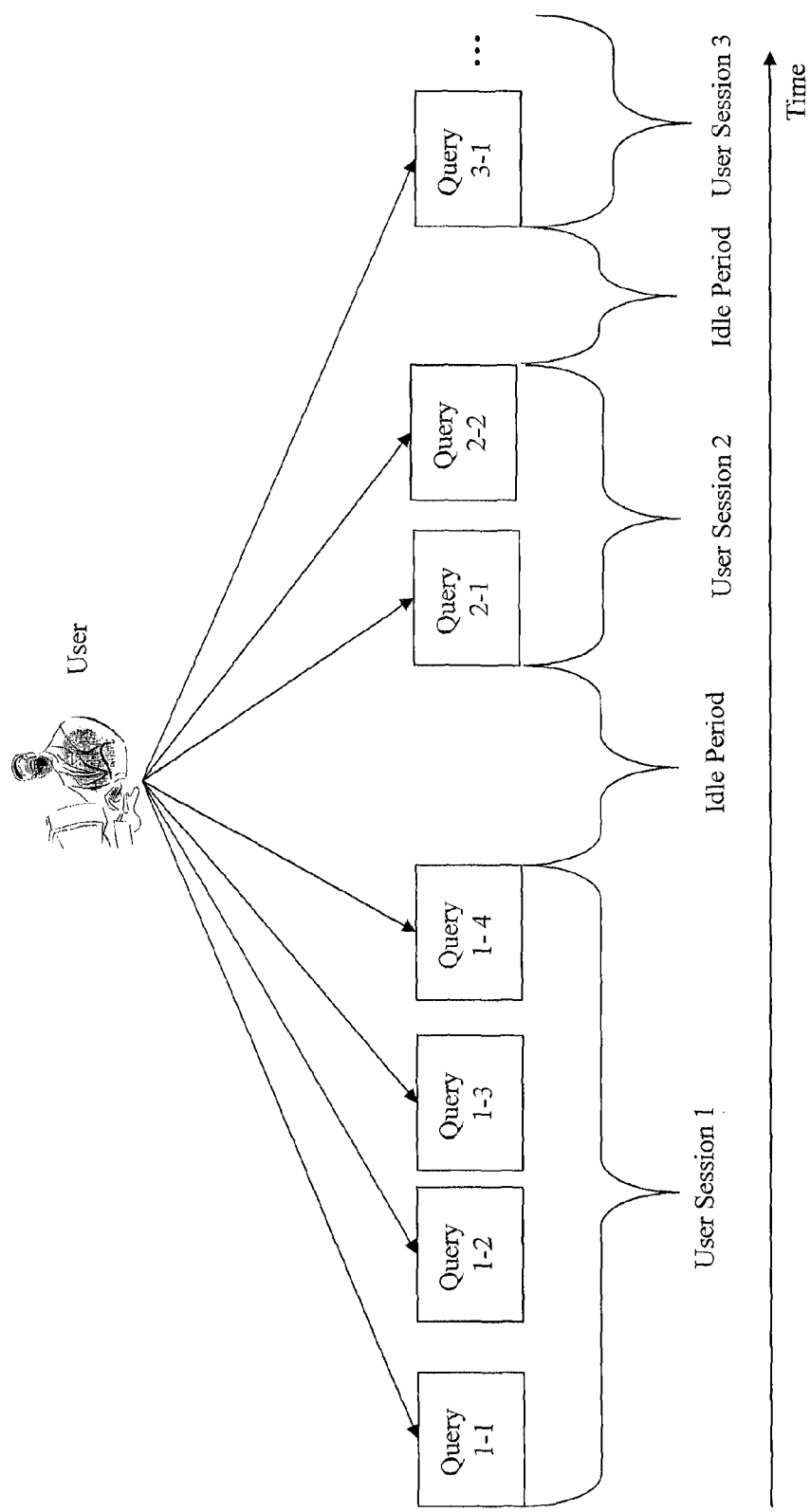
FIG. 2 depicts exemplary user sessions.

FIG. 2 depicts exemplary user sessions. In this example, four queries (queries 1-1 . . . 1-4) are entered in the first user session (user session 1), where the time intervals between entering adjacent two queries (idle times) are below a threshold value. For example, the user first enters "nba" (query 1-1). As the user is not satisfied with the search results of the first query, the user enters the second query "chicago bulls" (query 1-2) one minute after the first query (query 1-1). The user subsequently enters the third query "derrick rose" (query 1-3) and the fourth query "injury" (query 1-4) to further refine the search results as the user intends to focus on the update of Derrick Rose's recent injury. As the idle times between the second, third and fourth queries (queries 1-2 . . . 1-4) are also below a preset threshold value, e.g., 5 minutes, the third and fourth queries (queries 1-3, 1-4) are recorded by the user session recording module 106 in the first user session (user session 1). The user eventually obtains the desired search results from the fourth query (query 1-4), and thus quits the search application or stops entering any search query for a period of time, which exceeds the threshold value. As the idle time exceeds the threshold value, the user session recording module 106 considers the first user session (user session 1) is finished. Next time, when the user enters another query again (query 2-1), a new user session (user session 2) is started. As shown in FIG. 2, search queries entered by the same user are recorded and organized in multiple user sessions based on corresponding timestamps. Once a search suggestion request is issued, the user session recording module 106 retrieves one or more previous queries recorded in the same user session, in particular, the immediate previous query, which reflects well the user's current search behavior and intent. The immediate previous query is a query received in the same user session before the current query without any intervening query. In other words, the immediate previous query and the current query are two consecutive queries in the same user session.

Figure 3:
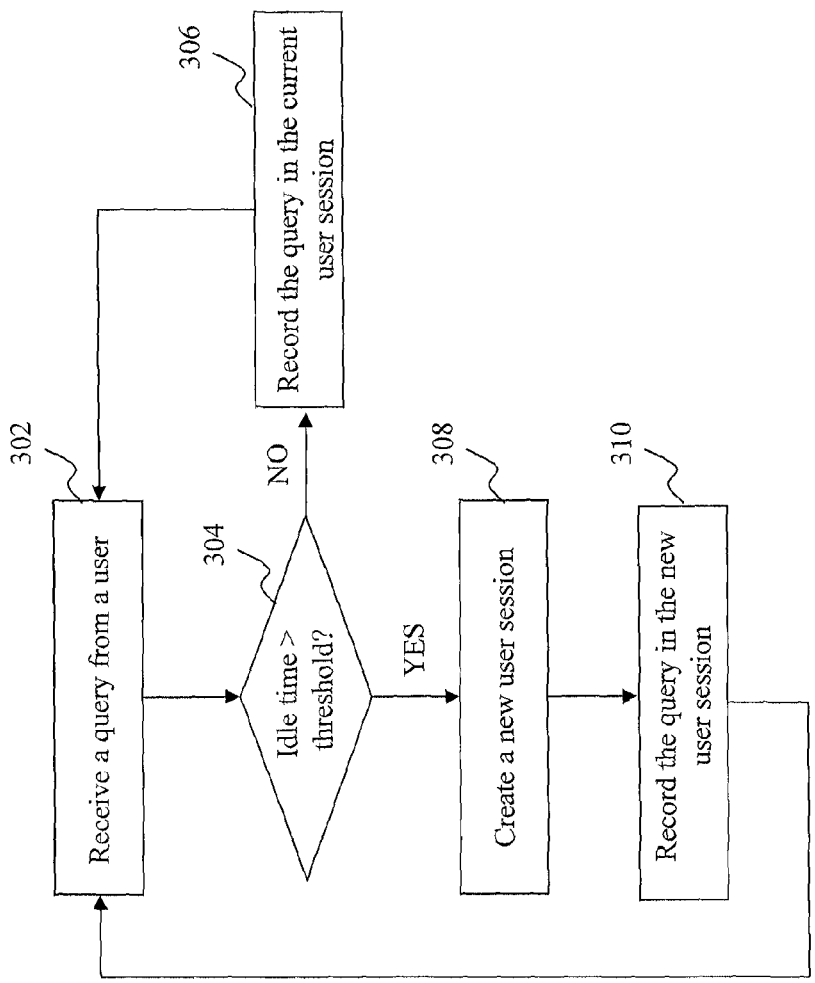
FIG. 3 is a flowchart of an exemplary process for recording search queries in a user session, according to an embodiment of the present teaching.

FIG. 3 is a flowchart of an exemplary process for recording search queries in a user session, according to an embodiment of the present teaching. Starting at 302, a search query is received from a user. The idle time between the current search query and the immediate previous query received from the same user is compared against a predetermined threshold value at 304 to determine whether the two consecutive queries belong to the same user query. If the idle time does not exceed the threshold value, at 306, the current query is recorded in the current user session. Otherwise, a new user session is created at 308, and the current query is recorded as the first query of the new user session at 310. It is understood that, in other examples, instead of using idle time to define a user session, a user session may be defined by a predetermined time window, e.g., 10 minutes. That is, any queries entered within the predetermined time window after the user accesses the search application are considered as in the same user session, and the user session ends when the predetermined time window ends.

Returning to FIG. 1, once a query prefix is received by the search serving engine 102 and forwarded to the search suggestion engine 104, the search suggestion engine 104 is configured to fetch one or more previous queries (including the immediate pervious query) in the user session from the user session recording module 106 based on the unique user ID. The search suggestion engine 104 is further configured to fetch a set of contextual suggestions from a contextual suggestion database 110 based on the query prefix and the fetched one or more previous queries. The contextual suggestion database 110 contains high co-occurrence query pairs (contextual query pairs), which have been mined from user search query logs. In one example, the high co-occurrence query pairs are mined by analyzing user sessions and collecting query pairs in the same user session. All queries and potential contextual query pairs are then aggregated, joined with various counts and filters, and scored with log-likelihood ration and other measures. For example, the contextual suggestion database 110 includes high co-occurrence query pairs: <chicago bulls, espn nba>, <chicago bulls, boston celtics,>, <chicago bulls, la lakers>, etc. Given the immediate previous query "chicago bulls", the search suggestion engine 104 fetches the query suggestion "boston celtics" if user's prefix input is "b," which is more relevant compared with non-contextual query suggestion, for example, "bank of America."

Figure 4:
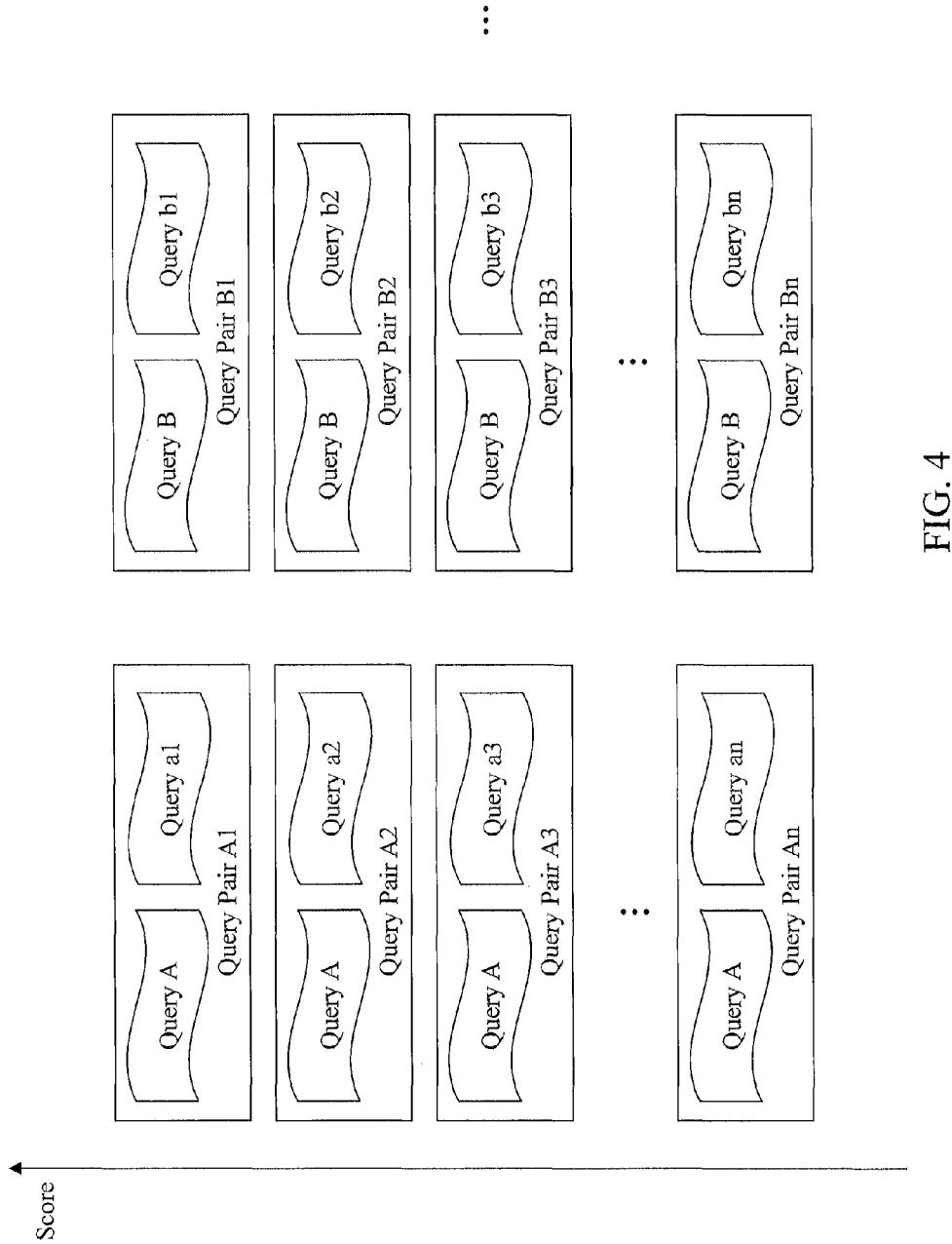
FIG. 4 depicts exemplary query pairs in a contextual suggestion database, according to an embodiment of the present teaching.

FIG. 4 depicts exemplary query pairs in a contextual suggestion database, according to an embodiment of the present teaching. Each query pair includes a first query and a second query that are deemed having a high co-concurrence in a user session. Relevance scores indicating likelihood that two queries in the corresponding query pair will be received in the same user session are calculated when the query pairs are mined from the query logs. In this example, query pairs are organized based on the same first query and ranked by their relevance scores. For example, the first query A may be "chicago bulls," and the second query a1, a2, a3 may be "espn nba," "boston celtics," and "la lakers," respectively. The first queries A, B, . . . in the query pairs are used for matching the previous query in a search suggestion request, and the second queries a1-an, b1-bn, . . . in the query pairs are used for matching the prefix of the current query in the search suggestion request. One example of building a contextual suggestion database with high co-occurrence query pairs is disclosed in U.S. Pat. No. 8,255,414, having a title "SEARCH ASSIST POWERED BY SESSION ANALYSIS," which is incorporated herein by reference.

Returning to FIG. 1, in this embodiment, the search suggestion engine 104 may also fetch regular query suggestions from a regular suggestion database 112. Query suggestions in the regular suggestion database 112 are relevant queries mined from query logs with respect to general user population without considering a specific user's current search behavior. The fetching of the regular query suggestions is thus based only on the current query prefix, but not the previous query in the user session. If both the contextual and regular query suggestions are fetched, the search suggestion engine 104 presents blended query suggestions to the user. For example, the two different types of query suggestions may be differentiated when they are presented to the users. In one example, the contextual query suggestions are presented as the top n suggestions to the user, followed by the regular query suggestions. In another example, the contextual query suggestions are presented as the bottom n suggestions. In still another example, different labels may be given to the contextual and regular query suggestions to differentiate them. One of the reasons for providing the blended query suggestions is that the user may suddenly switch search intent even in the same user session. For example, it is possible that even the user searched "chicago bulls" one minute ago, she/he may suddenly decide to pay the credit card bill and start to type "b" in the search field with the intent of searching for the Bank of America's website. In this situation, the blended suggestions with both contextual and regular query suggestions can still provide the most relevant suggestions to the user. In addition, regular query suggestions may be necessary when the contextual suggestions become unavailable in some situations, such as when there is no user ID can be identified or the previous query is unavailable.

Figure 5:
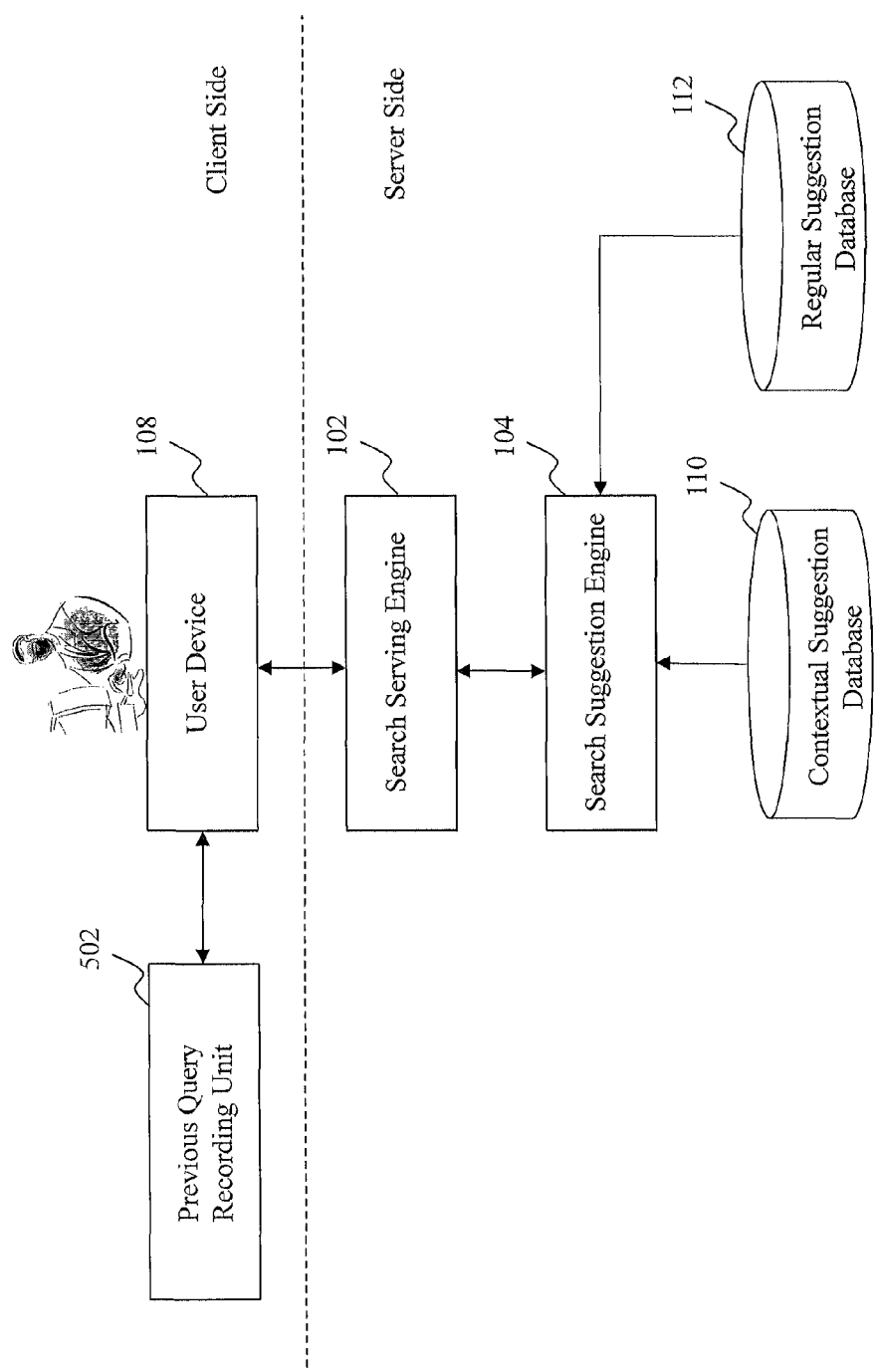
FIG. 5 is a high level exemplary system diagram of another system for contextual based search suggestion, according to an embodiment of the present teaching.

FIG. 5 is a high level exemplary system diagram of another system for contextual based search suggestion, according to an embodiment of the present teaching. The system in FIG. 5 is similar to the system in FIG. 1 except that the server-side user session recording module 106 and user session database 114 are replaced with a previous query recording unit 502 deployed on the client side. In this embodiment, the previous query recording unit 502 may be implemented by JavaScript at the client side that keeps track of user's immediate previous query, and passes it to the search serving engine 102 with each search request. Compared with the system shown in FIG. 1, the system in this embodiment avoids remote user session storing and fetching, thereby simplifying the backend work-flow and improving latency.

Figure 6:
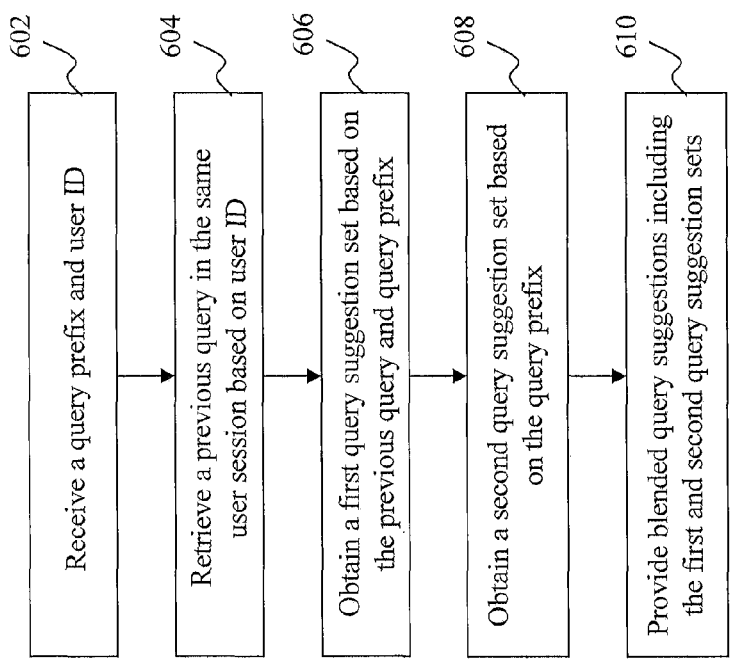
FIG. 6 is a flowchart of an exemplary process for providing search suggestion based on user's previous search query, according to an embodiment of the present teaching.

FIG. 6 is an exemplary process for providing search suggestion based on user's previous search query, according to an embodiment of the present teaching. Starting at 602, a query prefix and a user ID are received. In one example, a user first logs into a search application using user ID and then enters the query prefix (e.g., the first character of the query) in the search field of the search application. In another example, the user does not log into any search application, but instead, enters the query prefix in the search field of a web browser, which records user ID in cookies. In any event, the query prefix and user ID are received by the remote search serving engine 102. At 604, a previous query in the same user session is retrieved based on the user ID. In this example, the previous query is the immediate previous query in the same user session. In other examples, more than one previous query in the user session may be fetched to provide context of the user's current search. As described before, the previous query may be fetched from a backend database or provided along with the current query prefix by a client-side program. Moving to 606, a first query suggestion set, i.e., one or more contextual suggestions are obtained based on the previous query and the current query prefix. The user's previous query is used as a retrieving key to look up a contextual suggestion database for collecting suggestions that match the pervious query and the current query prefix (e.g., using prefix match). At 608, a second query suggestion set, i.e., one or more regular query suggestions are obtained based on the current query prefix alone without considering the previous query. The first and second sets of query suggestions may be blended and ranked based on their relevance scores. At 610, the blended query suggestions are provided to the user. It is understood that, the query suggestions are updated in run-time as the user continues to type in more characters of the current search query, i.e., updating the prefix of the current query.

Figure 7:
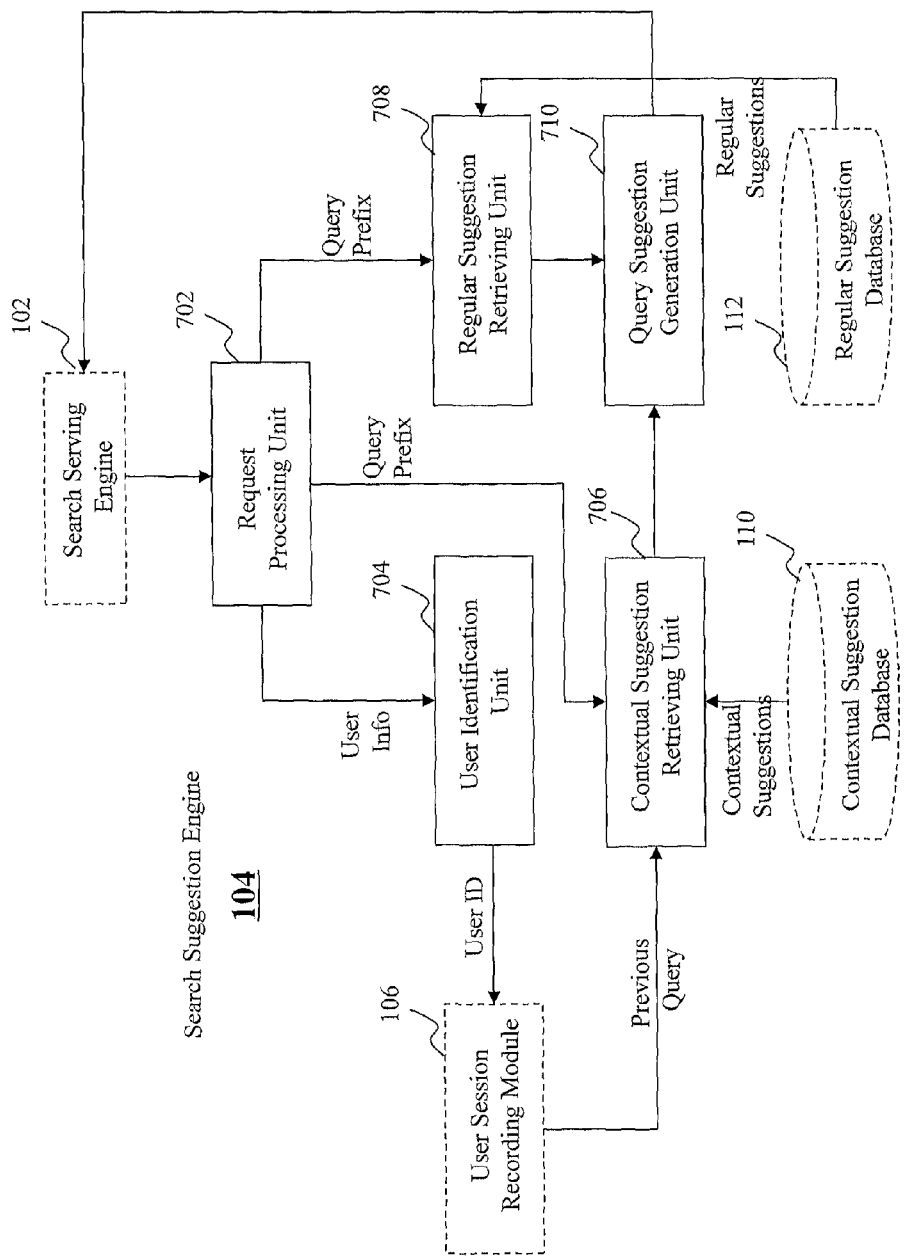
FIG. 7 is an exemplary diagram of a search suggestion engine of the system for contextual based search suggestion shown in FIG. 1, according to an embodiment of the present teaching.

FIG. 7 is an exemplary diagram of a search suggestion engine of the systems for contextual based search suggestion shown in FIG. 1, according to an embodiment of the present teaching. The search suggestion engine 104 includes a request processing unit 702, a user identification unit 704, a contextual suggestion retrieving unit 706, a regular suggestion retrieving unit 708, and a query suggestion generation unit 710. The request processing unit 702 in this example receives a search suggestion request from the search serving engine 102, which includes a prefix of current query and user information. The request processing unit 702 is responsible for sending the user information to the user identification unit 704 in order to identify the unique user ID. The user information may include the user's login information and/or cookie information. The user identification unit 704 is configured to determine the unique user ID based on the user's login information and/or cookie information and send the unique user ID to the user session recording module 106. The user session recording module 106 then identifies the corresponding user session for the particular user based on the unique user ID and returns one or more previous queries in the current user session to the contextual suggestion retrieving unit 706. The contextual suggestion retrieving unit 706 receives the current query prefix from the request processing unit 702 as well. The contextual suggestion retrieving unit 706 fetches contextual suggestions from the contextual suggestion database 110 based on both the previous query and current query prefix. The current query prefix is provided by the request processing unit 702 to the regular suggestion retrieving unit 708 as well in this example. The regular suggestion retrieving unit 708 is responsible for fetching regular suggestions from the regular suggestion database 112. The numbers of fetched contextual and regular suggestions may be predetermined or dynamically adjusted based on the number of characters in the current query prefix. For example, as more characters in the current query are typed in, the numbers of contextual and regular suggestions may be reduced as the candidates are narrowed down. Both the fetched contextual suggestions and regular suggestions are fed into the query suggestion generation unit 710. The query suggestion generation unit 710 may further filter and rank the blended query suggestions and return them to the search serving engine 102 as a response to the search suggestion request.

Figure 8:
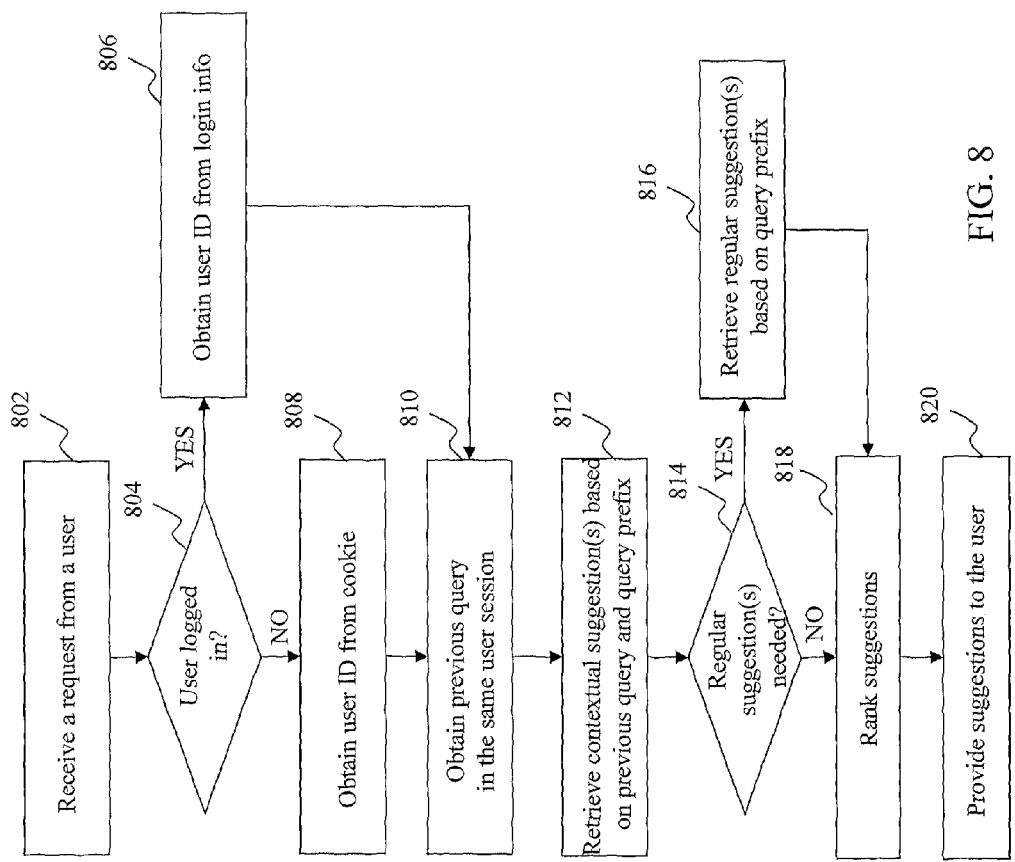
FIG. 8 is a flowchart of another exemplary process for providing search suggestion based on user's previous search query, according to an embodiment of the present teaching.

FIG. 8 is a flowchart of another exemplary process for providing search suggestion based on user's previous search query, according to an embodiment of the present teaching. Starting at 802, a search request is received from a user. The search request includes a prefix of current query entered into the search field of a search application or web browser. At 804, whether the user has logged into the search application is checked. If so, at 806, a unique user ID is obtained from the user login information. Otherwise, at 808, the user ID is obtained from cookies. Moving to 810, one or more previous queries in the same user session are retrieved based on the unique user ID. For example, the immediate previous query is either fetched from a backend database or provided by a client-side program. At 812, one or more contextual query suggestions are retrieved from contextual query pairs based on both the previous query and the current query prefix. Each of the retrieved contextual query suggestions may be assigned with a relevance score indicating likelihood that the respective contextual query suggestion and the previous query are received in the same user session. At 814, whether regular query suggestions are needed is checked. For example, regular query suggestions become needed when there is no or very few contextual query suggestion can be fetched or when the system is configured to always show blended query suggestions. At 816, one or more regular query suggestions are retrieved based on the current query prefix. Each of the regular query suggestions may also be assigned with a relevance score. At 818, the retrieved query suggestions, including contextual query suggestions and/or regular query suggestions, are ranked based on their relevance scores. It is understood that as the relevance scores for the contextual and regular suggestions are calculated based on different mechanisms (e.g., calculating relevance scores for regular suggestions does not take co-concurrence with previous query into account), relevance scores may be normalized for different types of query suggestions in order to rank them. At 820, the top n blended query suggestions are provided to the user. The number n of the query suggestions may depend on the number of characters in the current query prefix.

Figure 9:
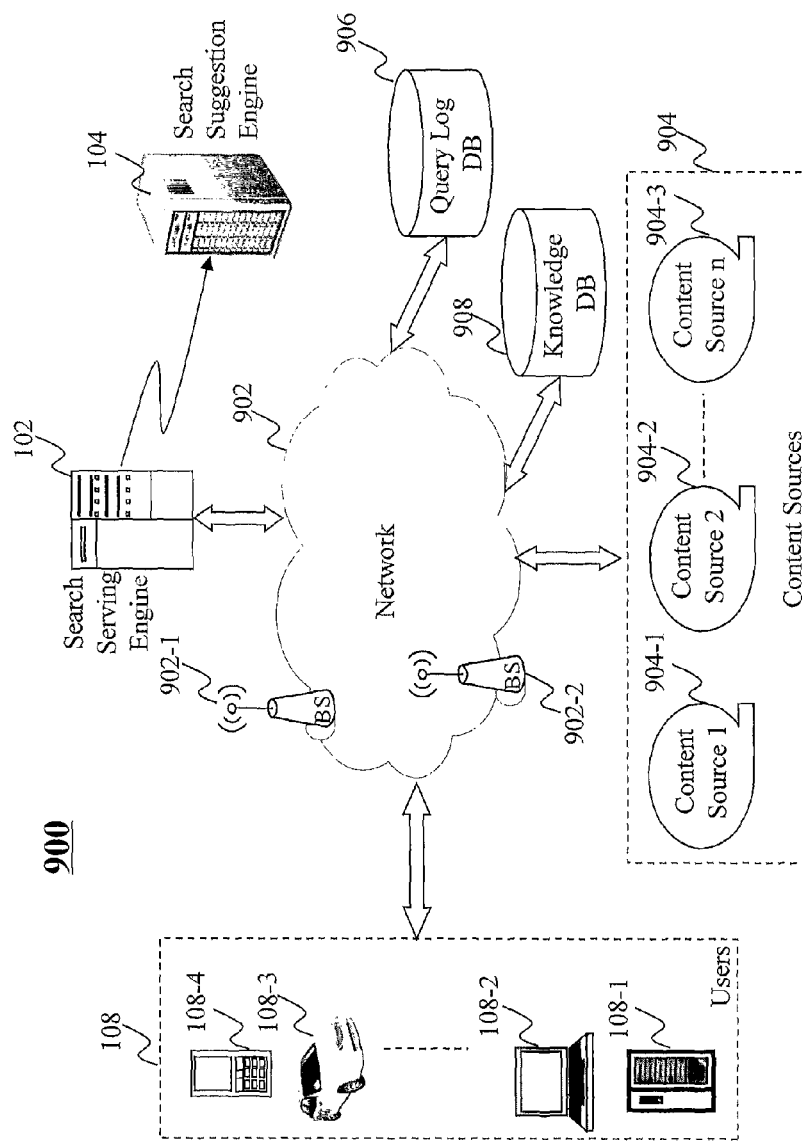
FIG. 9 depicts an exemplary embodiment of a networked environment in which the present teaching is applied, according to an embodiment of the present teaching.

FIG. 9 depicts an exemplary embodiment of a networked environment in which the present teaching is applied, according to an embodiment of the present teaching. In FIG. 9, the exemplary networked environment 900 includes the search serving engine 102, the search suggestion engine 104, one or more users 108, a network 902, content sources 904, a query log database 906, and a knowledge database 908. The network 902 may be a single network or a combination of different networks. For example, the network 902 may be a local area network (LAN), a wide area network (WAN), a public network, a private network, a proprietary network, a Public Telephone Switched Network (PSTN), the Internet, a wireless network, a virtual network, or any combination thereof. The network 902 may also include various network access points, e.g., wired or wireless access points such as base stations or Internet exchange points 902-1, ..., 902-2, through which a data source may connect to the network 902 in order to transmit information via the network 902.

Users 108 may be of different types such as users connected to the network 902 via desktop computers 108-1, laptop computers 108-2, a built-in device in a motor vehicle 108-3, or a mobile device 108-4. A user 108 may send a query or query prefix to the search serving engine 102 via the network 902 and receive query suggestions and search results from the search serving engine 102. The search serving engine 102 and search suggestion engine 104 may access information stored in the query log database 906 and knowledge database 908 via the network 902. The information in the query log database 906 and knowledge database 908 may be generated by one or more different applications (not shown), which may be running on the search serving engine 102, at the backend of the search serving engine 102, or as a completely standalone system capable of connecting to the network 902, accessing information from different sources, analyzing the information, generating structured information, and storing such generated information in the query log database 906 and knowledge database 908.

The content sources 904 include multiple content sources 904-1, 904-2, ..., 904-3, such as vertical content sources. A content source 904 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search serving engine 102 may access information from any of the content sources 904-1, 904-2, ..., 904-3. For example, the search serving engine 102 may fetch content, e.g., websites, through its web crawler to build a search index.

Figure 10:
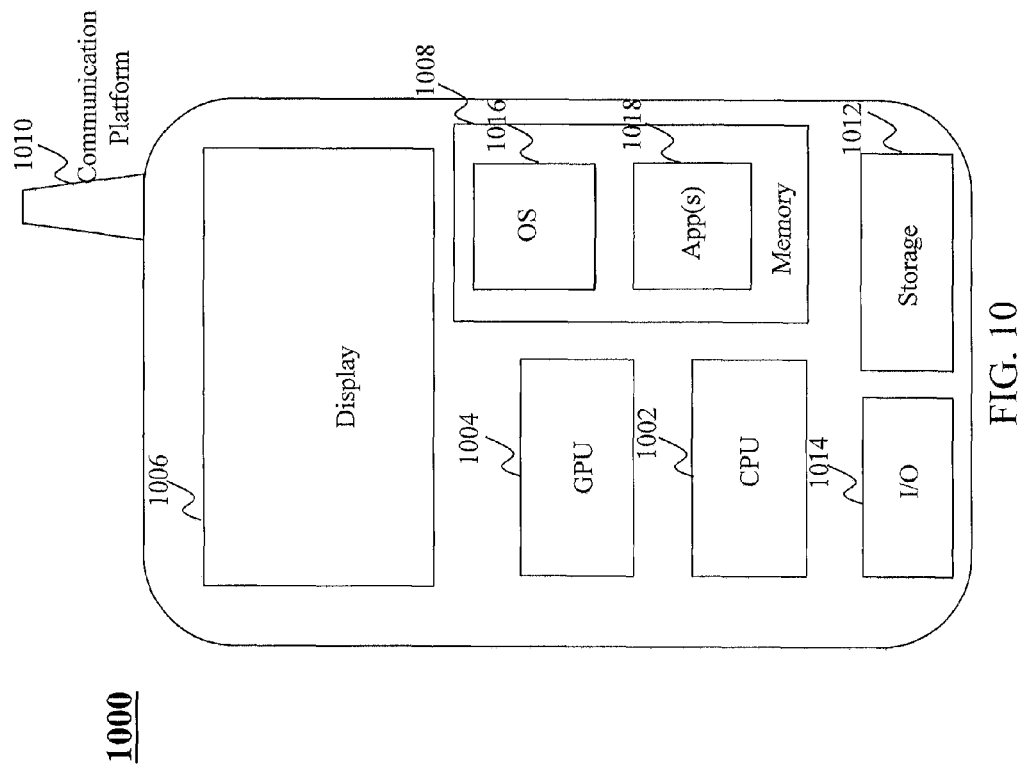
FIG. 10 depicts a general mobile device architecture on which the present teaching can be implemented.

FIG. 10 depicts a general mobile device architecture on which the present teaching can be implemented. In this example, the user device 108 is a mobile device 1000, including but is not limited to, a smart phone, a tablet, a music player, a handled gaming console, a GPS receiver. The mobile device 1000 in this example includes one or more central processing units (CPUs) 1002, one or more graphic processing units (GPUs) 1004, a display 1006, a memory 1008, a communication platform 1010, such as a wireless communication module, storage 1012, and one or more input/output (I/O) devices 1014. Any other suitable component, such as but not limited to a system bus or a controller (not shown), may also be included in the mobile device 1000. As shown in FIG. 10, a mobile operating system 1016, e.g., iOS, Android, Windows Phone, etc., and one or more applications 1018 may be loaded into the memory 1008 from the storage 1012 in order to be executed by the CPU 1002. The applications 1018 may include a web browser or any other suitable mobile search apps. Execution of the applications 1018 may cause the mobile device 1000 to perform some processing as described before. For example, the display of search suggestions and results is made by the GPU 1004 in conjunction with the display 1006. User inputs of search queries are received via the I/O devices 1014 and sent to the search serving engine 102 via the communication platform 1010.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 11:
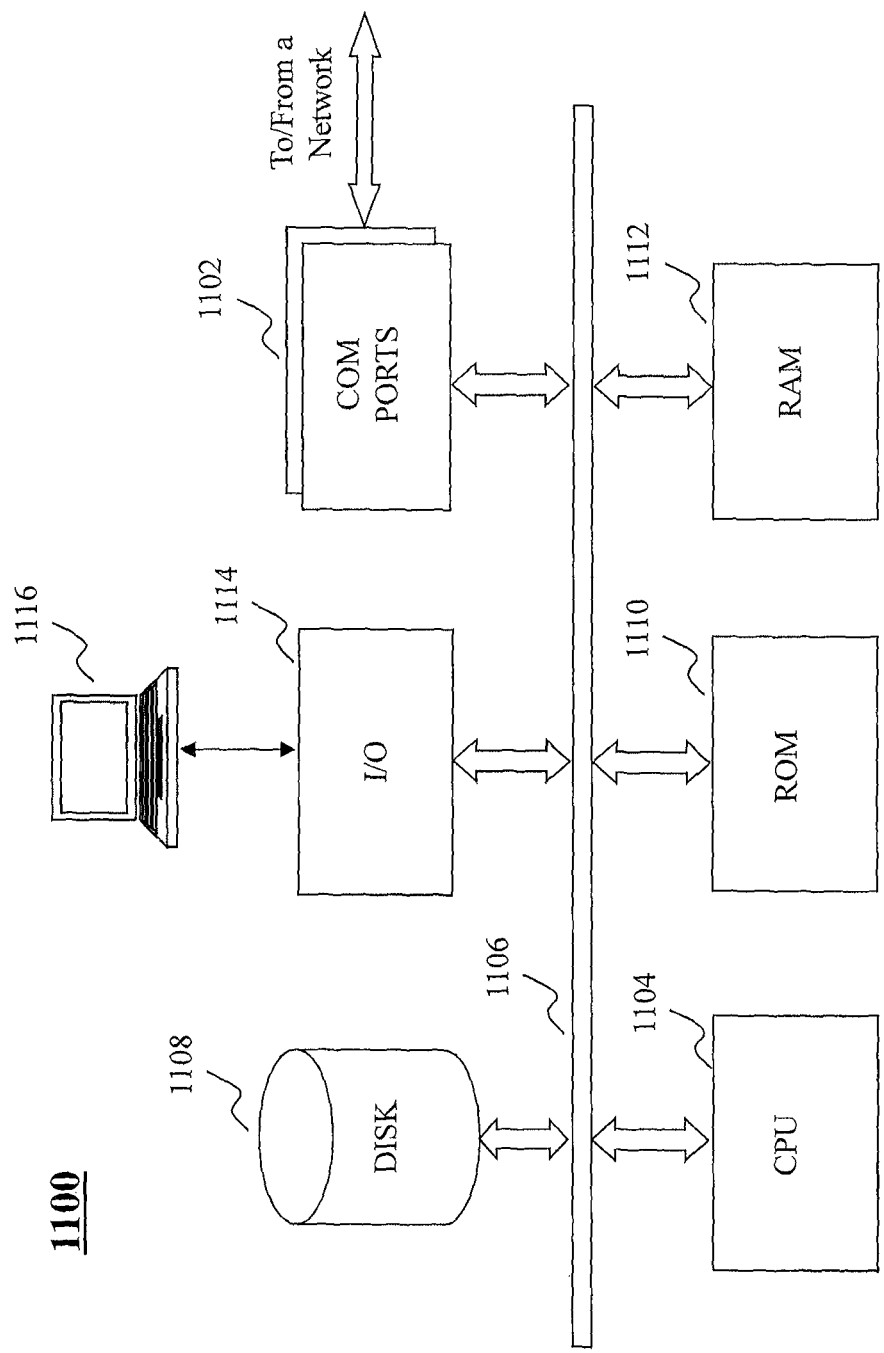
FIG. 11 depicts a general computer architecture on which the present teaching can be implemented.

FIG. 11 depicts a general computer architecture on which the present teaching can be implemented and has a functional block diagram illustration of a computer hardware platform that includes user interface elements. The computer may be a general-purpose computer or a special purpose computer. This computer 1100 can be used to implement any components of the search suggestion architecture as described herein. Different components of the system, e.g., as depicted in FIGS. 1 and 5, can all be implemented on one or more computers such as computer 1100, via its hardware, software program, firmware, or a combination thereof. Although only one such computer is shown, for convenience, the computer functions relating to search suggestion may be implemented in a distributed fashion on a number of similar platforms, to distribute the processing load.

The computer 1100, for example, includes COM ports 1102 connected to and from a network connected thereto to facilitate data communications. The computer 1100 also includes a CPU 1104, in the form of one or more processors, for executing program instructions. The exemplary computer platform includes an internal communication bus 1106, program storage and data storage of different forms, e.g., disk 1108, read only memory (ROM) 1110, or random access memory (RAM) 1112, for various data files to be processed and/or communicated by the computer, as well as possibly program instructions to be executed by the CPU 1104. The computer 1100 also includes an I/O component 1114, supporting input/output flows between the computer and other components therein such as user interface elements 1116. The computer 1100 may also receive programming and data via network communications.

Hence, aspects of the method of search suggestion, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one machine each of which has at least one processor, storage, and a communication platform connected to a network for providing query suggestions, the method comprising:
   receiving, by the at least one processor, a prefix of a first query from a user device during a first session;
   obtaining, by the at least one processor, at least a second query that was previously received from the user device during the first session;
   obtaining, by the at least one processor, a third query having a high co-occurrence with the second query, wherein the third query includes the prefix of the first query, and wherein the third query was previously received from the user device during a second session different than the first session;
   providing, by the at least one processor, the third query as a query suggestion to the user device in response to the prefix of the first query being received;
   obtaining a fourth query based on the prefix without considering the second query, wherein the query suggestion includes the fourth query;
   receiving a plurality of queries from the user device during the first session, wherein time intervals between each of the plurality of queries are below a threshold; and
   recording each of the plurality of queries received during the first session, wherein the third query and the fourth query are blended with other queries in one or more additional query suggestions, the one or more additional query suggestions being ranked based on a respective relevance score of the third query, the fourth query, and the other queries.

2. The method of claim 1, wherein the second query and the first query are two consecutive queries received during the first session.

3. The method of claim 1, wherein obtaining the third query comprises:
   identifying one or more query pairs based on the second query, wherein each of the one or more query pairs includes the second query; and
   determining the third query based on another query in each of the one or more query pairs.

4. The method of claim 3, wherein each of the one or more query pairs is associated with a likelihood that two queries in a corresponding query pair will be received during a same user session.

5. The method of claim 1,
   wherein obtaining at least the second query comprises:
      determining an identification of the user device based on user login information and/or a cookie; and
      identifying the first session based on the identification of the user device, and
   wherein the prefix of the first query and the second query are received from the user during the first session.

6. The method of claim 1, wherein the third query is updated in run-time as more characters beyond the prefix of the first query are received from the user device in the first session.

7. The method of claim 1, wherein an amount of query suggestions is predetermined or dynamically adjusted based on an amount of characters in the prefix of the first query.

8. The method of claim 1, wherein obtaining at least the second query comprises:
   determining an identification of the user device based on user login information and/or a cookie, and wherein the at least second query is obtained based on the identification of the user device.

9. The method of claim 1, wherein the first session comprises a period of time during which a user interfaces with a search application, the first session beginning when a user accesses the search application, and the session ending when the user quits the search application or the user has been inactive with the search application for a predetermined period of time.

10. A system having at least one processor, storage, and a communication platform for providing query suggestions, the system comprising:
  a request processing unit implemented on the at least one processor and configured to receive a prefix of a first query from a user device during a first session;
  a first suggestion retrieving unit implemented on the at least one processor and configured to:
    obtain at least a second query that was previously received from the user device during the first session, and
    obtain a third query having a high co-occurrence with the second query, wherein the third query includes the prefix of the first query, and wherein the third query was previously received from the user device during a second session different than the first session;
  a query suggestions generation unit implemented on the at least one processor and configured to provide the third query as a query suggestion to the user device in response to the prefix of the first query being received;
  a second suggestion retrieving unit implemented on the at least one processor and configured to obtain a fourth query based on the prefix without considering the second query, wherein the query suggestion includes the fourth query; and
  a user session recording module implemented on the at least one processor and configured to:
    receive a plurality of queries from the user device during the first session, wherein time intervals between each of the plurality of queries are below a threshold, and
    record each of the plurality of queries received during the first session, wherein the third query and the fourth query are blended with other queries in one or more additional query suggestions, the one or more additional query suggestions being ranked based on a respective relevance score of the third query, the fourth query, and the other queries.

11. The system of claim 10, wherein the second query and the first query are two consecutive queries received during the first session.

12. The system of claim 10, wherein the first suggestion retrieving unit is further configured to:
  identify one or more query pairs based on the second query, wherein each of the one or more query pairs includes the second query; and
  determine the third query based on another query in each of the one or more query pairs.

13. The system of claim 12, wherein each of the one or more query pairs is associated with a likelihood that two queries in a corresponding query pair will be received during a same user session.

14. The system of claim 10, further comprising:
  a user identification unit implemented on the at least one processor and configured to:
    determine an identification of the user device based on user login information and/or a cookie; and
    identify the first session based on the identification of the user device, wherein the prefix of the first query and the second query are received from the user device during the first session.

15. A non-transitory machine-readable medium having information recorded thereon for providing query suggestions, wherein the information, when read by a machine, causes the machine to perform the following:
  receiving a prefix of a first query from a user device during a first session;
  obtaining at least a second query that was previously received from the user device during the first session;
  obtaining a third query having a high co-occurrence with the second query, wherein the third query includes the prefix of the first query, and wherein the third query was previously received from the user device during a second session different than the first session;
  providing the third query as a query suggestion to the user device in response to the prefix of the first query being received;
  obtaining a fourth query based on the prefix without considering the second query, wherein the query suggestion includes the fourth query;
  receiving a plurality of queries from the user device during the first session, wherein time intervals between each of the plurality of queries are below a threshold; and
  recording each of the plurality of queries received during the first session, wherein the third query and the fourth query are blended with other queries in one or more additional query suggestions, the one or more additional query suggestions being ranked based on a respective relevance score of the third query, the fourth query, and the other queries.

16. The non-transitory machine-readable medium of claim 15, wherein the second query and the first query are two consecutive queries received during the first session.

17. The non-transitory machine-readable medium of claim 15, wherein the information corresponding to obtaining third query, when read by the machine, causes the machine to further perform the following:
  identifying one or more query pairs based on the second query, wherein each of the one or more query pairs includes the second query; and
  determining the third query based on another query in each of the one or more query pairs.

18. The non-transitory machine-readable medium of claim 17, wherein each of the one or more query pairs is associated with a likelihood that two queries in a corresponding query pair will be received during a same user session.

* * * * *